United States Patent [19]
Boulware et al.

[11] Patent Number: 5,806,789
[45] Date of Patent: Sep. 15, 1998

[54] OPTICAL APPARATUS FOR AN AIRCRAFT

[75] Inventors: Jesse M. Boulware; Roger F. Marquardt, both of Fort Worth, Tex.

[73] Assignee: Lockheed Corporation, Fort Worth, Tex.

[21] Appl. No.: 517,543

[22] Filed: Aug. 22, 1995

[51] Int. Cl.⁶ .................................................. B64D 47/00
[52] U.S. Cl. .................. 244/1 R; 244/129.1; 244/130; 348/117; 250/234; 382/103; 359/223; 359/844; 359/857; 359/876; 89/41.21
[58] Field of Search ................................ 244/1 R, 129.1, 244/118.1, 130, 129.3, 3.16; 348/117, 146, 144, 203, 167, 168, 552; 250/334, 203.1, 203.2, 203.7, 234, 231; 382/103; 359/223–226, 843, 557, 844, 857, 861, 872, 876; 89/41.71

[56] References Cited

U.S. PATENT DOCUMENTS 3,698,779  10/1972  Berry .
4,087,061  5/1978  Burt ......................................... 359/557
5,497,960  3/1996  Preiwane ................................. 348/117
5,529,261  6/1996  Iddan ..................................... 244/3.16

FOREIGN PATENT DOCUMENTS

2618122  1/1989  France ..................................... 244/1 R

*Primary Examiner*—Galen L. Barefoot
*Attorney, Agent, or Firm*—Arthur F. Zobal

[57] ABSTRACT

A fairing for an aircraft is provided, having a roll axis with a turret coupled to the front end of the fairing for rotation about the roll axis. An opening is formed through the front end of the turret in which a tracking member is supported for rotation between forward and rearward positions about a pitch axis transverse to the roll axis. The tracking member has a cavity with a primary optical mirror at one end and a transparent shield at an opposite end with a primary optical axis extending between the mirror and shield. The shield is slanted to minimize wind turbulence when the tracking member is located in a rearward position.

51 Claims, 10 Drawing Sheets

FORWARD FUSALAGE

ROLL ANGLE = 0°, TRACKER ANGLE = 0°

Fig. 29

ROLL ANGLE = 0°, TRACKER ANGLE = 140°

OPTICAL APPARATUS FOR AN AIRCRAFT

BACKGROUND OF THE INVENTION

1. Field of the Invention

The invention relates to an optical tracking turret for an aircraft.

2. Description of the Prior Art

Currently, optical turrets installed on aircraft for projecting a laser beam or viewing objects are mounted to the exterior of the aircraft for rotation about a vertical axis with a tracker member mounted to the turret for rotation about a horizontal axis with a fairing mounted aft of the turret. The ability to maintain undegraded performance is limited to the spherical sector lying between the straight ahead viewing line and aft to approximately 110 to 115 degrees. Beyond this limited aft look-angle, local aerodynamic flow separation on the aft face of the tracker causes near-field turbulence which measurably reduces the quality of the optical path.

SUMMARY OF THE INVENTION

It is an object of the invention to provide a turret mounted to a fairing member for carrying a tracker member for increasing the rearward angle at which remote objects may be viewed, or a laser beam projected, through relatively undisturbed airflow, by minimizing any distortion that might be imparted by aerodynamic turbulence at the optical window.

The rear end of the turret is coupled to the front end of a fairing to be coupled externally to an aircraft such that the front end of the fairing faces forward. The front end of the turret has an opening formed therethrough in which a tracker member is mounted for rotation about a pitch axis transverse to an axis extending from the front end of the fairing. The tracker member has a cavity with a primary optical mirror at one end and a planar transparent shield at an opposite end with a primary optical axis extending between the primary optical mirror and the transparent shield. Means is provided for rotating the tracker member and hence the primary optical axis between a forward position and a rearward position.

In one aspect, means is provided for rotating the turret about a roll axis which coincides with the axis of the fairing member.

In the preferred embodiment, the transparent shield is slanted in order to minimize wind turbulence when the tracker member is located at the rearward position.

Secondary mirrors are provided for directing an optical path between the roll axis and the primary optical mirror by way of the pitch axis with the optical path being expanded or contracted in the tracker member.

DESCRIPTION OF THE PRIOR ART

Figure 1:
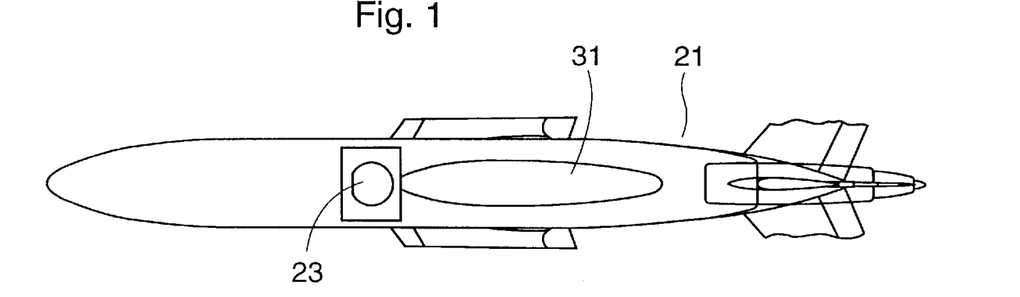
FIGS. 1 and 2 illustrate a prior art installed vertical tracker turret in the fuselage of an aircraft.
Figure 2:
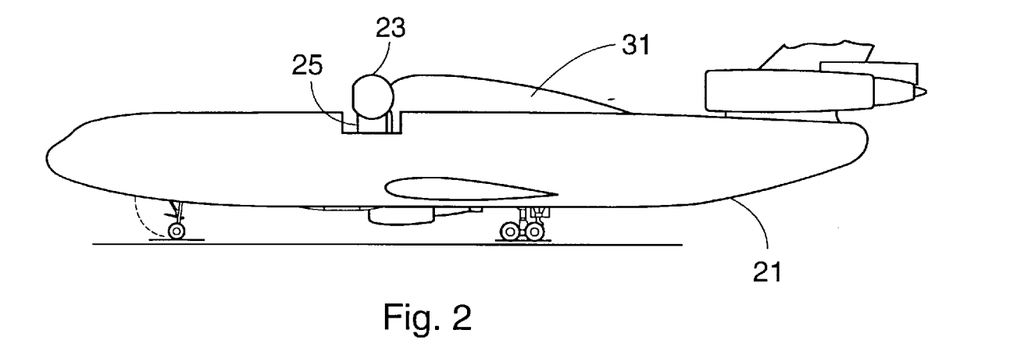

Referring now to FIGS. 1 and 2 there is illustrated an aircraft 21 with a tracker turret 23 mounted thereto in accordance with the prior art mounting arrangement.

Figure 3:
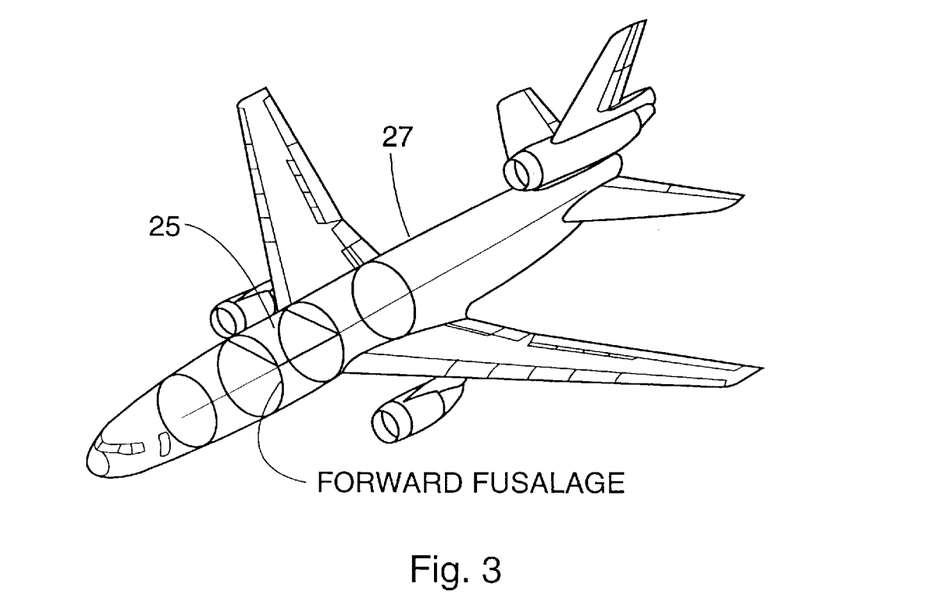
FIG. 3 illustrates a typical prior art cutout of the fuselage of an aircraft for installation of a large vertical turret.

The entire turret 23 turns about a vertical axis to provide azimuth, or horizontal bearing control. The upper, center portion of the turret is of truncated spherical shape and rotates about a horizontal axis to provide elevation or vertical control. Furthermore, such tracking turrets have been mounted so as to pierce the aircraft structure as shown in the inboard profile drawing of FIG. 2. The large portions of the aircraft structure which must be cut away and removed to permit the passage of the large turret are shown in FIG. 3. In this figure, a typical cutout 25 for a large turret 23 is clearly shown in the upper, forward portion of the aircraft fuselage 27. Such structural modification requires the addition of generally heavy auxiliary structure around the cutout to provide a path for the internal loads and stresses carried by the fuselage frames, skins and longerons of the removed structure. Even when so strengthened, the resulting structure often experiences a reduced stiffness with a consequent degradation in bending characteristics.

It must be noted that the large cutout can be minimized with the vertical mounting by placing the entire turret outside the aircraft structure. While this largely eliminates the cutout, there is a very large increase in aerodynamic drag that results because of the greatly increased turret exposure and the fairings around its base and aft of the turret. The aircraft's range and altitude performance is thus reduced accordingly.

Figure 4:
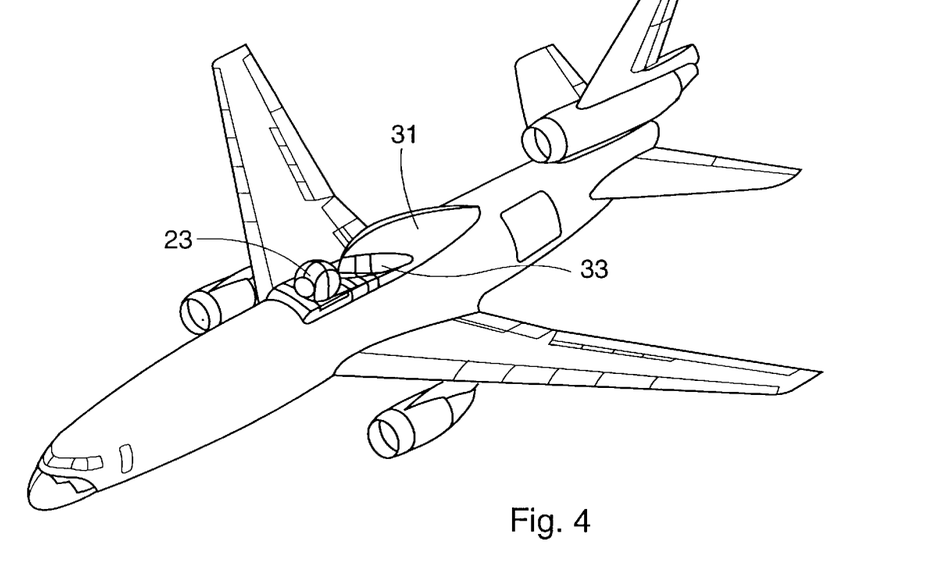
FIG. 4 is an external view of a prior art installed vertical turret and aerodynamic fairing.

The external characteristics of a turret installation typical of those used here-to-fore are shown in FIG. 4. Here may be seen the turret 23 and a typical aerodynamic fairing 31 located some distance behind the turret. The purpose of the fairing is to improve the aerodynamic flow immediately aft of the turret so as to reduce both wake turbulence and total aerodynamic drag of the turret installation. Because of the requirement for a large aft look angle, the forward portions of the fairing must be severely cut away at 33, resulting in reduced flow continuity and reduced fairing efficiency. A stylized sketch of the flow regime aft of the turret 23 is presented in FIG. 5. The area of turbulence 35 and the free shear layer 37 are caused by the separation of the aerodynamic flow from the surface of the turrets spherical body. Both of the phenomena degrade the Strehl Ratio, which is an indicator of how closely the focus of the optical path conforms to the ideal parameters at a remote point. A perfect optical wave front has, by definition, a Strehl ratio of 1.0. Depending on specific requirements, Strehl ratios below 0.95 to 0.90 are undesirable. With turrets of the kind now in use, Strehl ratios as low as 0.4 may be experienced for look angles greater than 120 degrees from forward (0 degrees), resulting in essentially unusable far-field imagery.

Thus, the inherent limitations and disadvantages of the approach now in use can be summarized as: (1) an increase in structural weight and degradation of structural integrity, (2) higher than desired added aerodynamic drag, and of greatest importance, (3) a limitation to the maximum optically-undegraded look angle that can be obtained.

One objective of the invention described herein is to greatly simplify the structural accommodation necessary for the installation of large tracker turrets. Another objective is to permit a significantly larger look-angle by minimizing the near-field aerodynamic effects on the optical path. It has not been possible to achieve both of these objectives by the previously described methods. The improvements of the invention are achieved by re-orienting and relocating the turret to an external location and by radically modifying the optical window geometry.

DETAILED DESCRIPTION OF THE PREFERRED EMBODIMENTS

Figure 6:
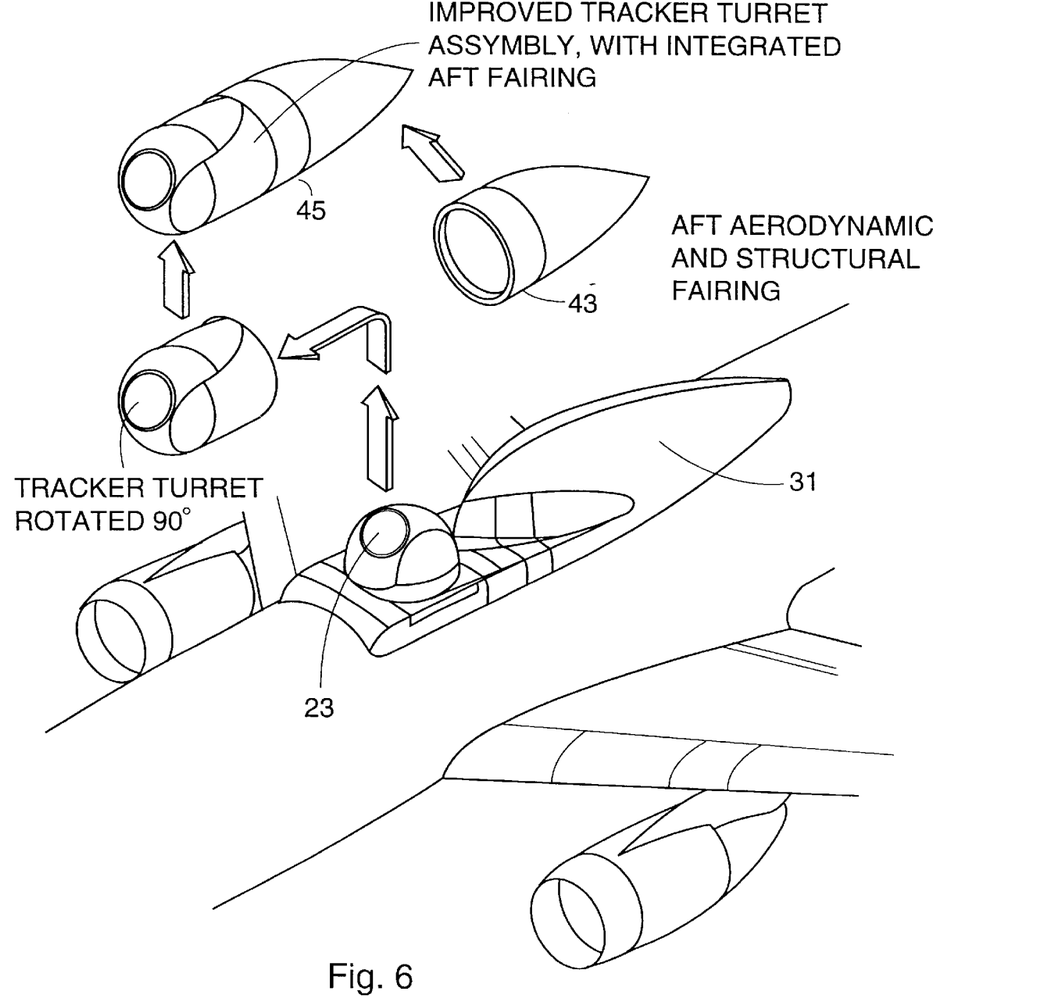
FIG. 6 illustrates the development of the tracker turret of the invention.

One of the aspects of the improved tracker turret is defined in FIG. 6. In this figure the development of the improved tracker turret is shown in two steps. First the tracker turret 23, (as in the arrangement illustrated in FIG. 4) is lifted out of the aircraft structure and rotated ninety degrees so that the modified turret 41 points forward and lies more or less parallel to the aircraft centerline. Next, an aft structural and closure fairing 43 is added to the turret body. Design of the aft fairing includes supporting structure for attachment of the assembly to the airframe, and to support the cantilevered rotating forward section of the pod, and includes a means of powering and positioning the rotating turret body section. The optical path also enters/leaves the host aircraft through the pod-aircraft interface and passes through the fairing to the turret, as will be described subsequently. The attached aft fairing replaces the separate aft fairing required by the vertically mounted turret used here-to-fore.

In the arrangement defined by this invention, the turret and fairing assembly 45 now becomes, in effect, a cylindrical pod with a hemispherical forebody and a faired afterbody. This configuration and orientation permits the tracker unit to be located outside the aircraft structure, and thus does not require the large cutout in the aircraft's fuselage structure which characterized previous applications.

For tracker turrets that are relatively small compared to the carrier aircraft, the approach defined herein has only minor structural benefits; however, it has rearward angle advantages as well as minimizing distortion that may be imparted by aerodynamic turbulence at the optical window as will be described subsequently. However, if the comparative size of the pod becomes large, then the structural cut out for a vertical installation becomes relatively large and costly in terms of added structure required to route load paths around the cut out. In the improved, external mounting arrangement, only the optical path and service routings (electrical, hydraulic, etc.) need penetrate the aircraft skin. In the case of a laser turret, the high energy laser beam is not expanded until it is in the turret, hence the diameter of the opening for it will be on the order of 15 to 20 percent of the diameter of the equivalent structural opening required for a vertical turret installation.

Figure 7:
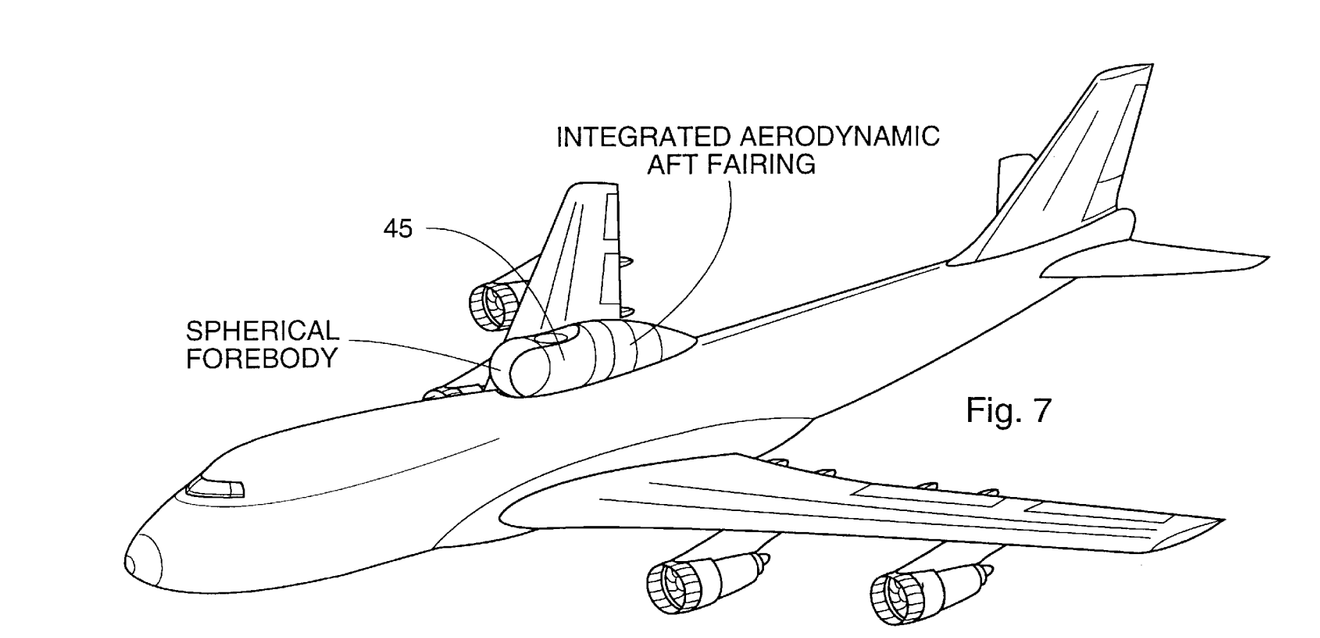
FIG. 7 illustrates the pod and tracker turret of the invention installed atop the fuselage of an aircraft.

The podded turret, with its integrated, aerodynamically-faired afterbody, can be attached to the airframe tangentially, partially submerged, or on a pylon, depending on the requirements of the specific installation. A typical partially submerged installation of the assembly or pod 45 is illustrated in FIG. 7. Use of the partially submerged arrangement does not disrupt continuity of load paths into the airframe structure. The structural modifications for the partially submerged pod replaces the normally convex aircraft skin with a concave skin portion that has continuous longerons and uninterrupted fuselage frames to carry the structural loads. While this will necessitate some structural redesign, it does not result in a large opening such as that needed for vertical turret installation. Further, the concavity provides the capability to support and stabilize the rotating forward portion of the pod with a curved bearing area.

Figure 8:
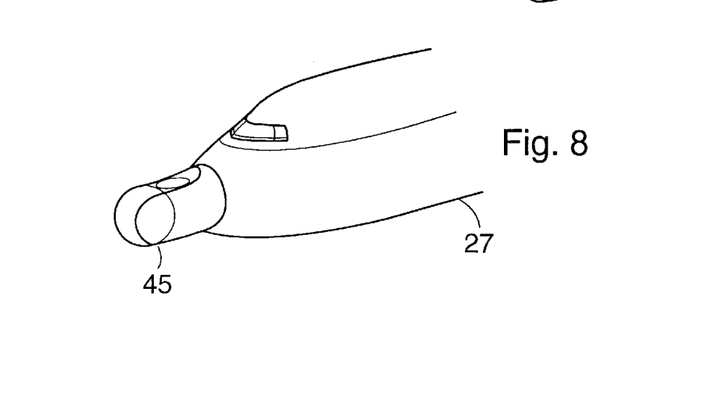
FIG. 8 illustrates the pod and tracker turret of the invention installed in an aircraft nose.
Figure 9:
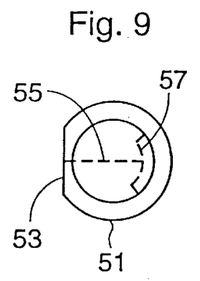
FIG. 9 is a side view of an optical tracker.
Figure 10:
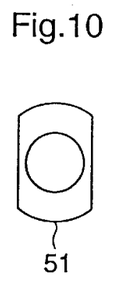
FIG. 10 is a view of FIG. 9 as seen from the left end of FIG. 9.
Figure 11:
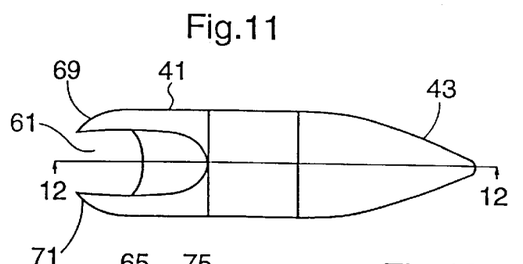
FIG. 11 is a top view of the fairing and turret of one embodiment of the invention.
Figure 12:
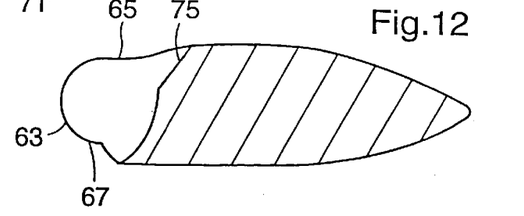
FIG. 12 is a cross-sectional view of the fairing and turret of FIG. 11 as seen along the lines 12—12 thereof.
Figures 13, 15:
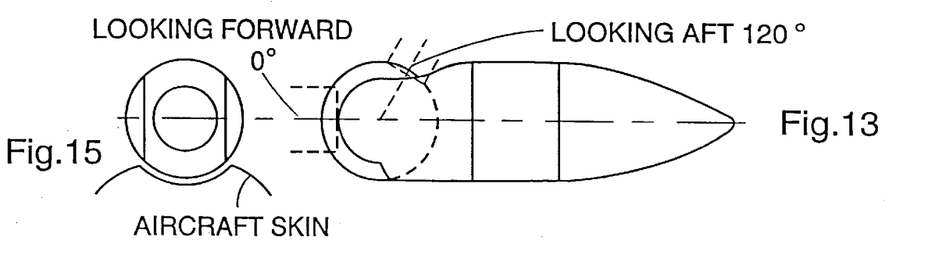
FIG. 13 is a side view of the fairing and turret of the invention with the tracker of FIGS. 9 and 10 installed thereon and positioned to look rearward and also shown to look forward.
FIG. 15 is an end view of the fairing and turret of FIG. 13 with the tracker of FIGS. 9 and 10 installed thereon and positioned to look forward.
Figure 14:
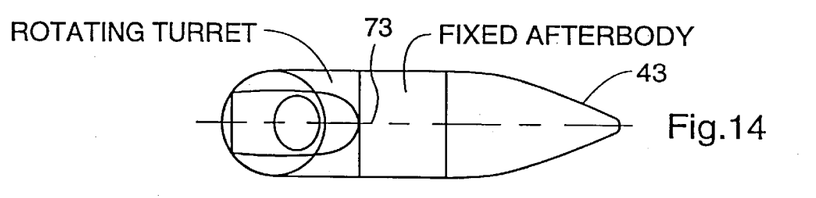
FIG. 14 is a top view of FIG. 13.

Another advantage of the invention herein described is achieved because the pod does not require a large cut out and thus can be mounted where needed or desired with a minimum of concern for the structural aspects of the basic airframe. This permits locations based on external aerodynamic flow and pressure fields and on proximity to related internal equipment. An example of an alternative is also shown in FIG. 8. Here the pod is located in the nose of the fuselage 27 with the bulk of the turret mechanism and structure buried in the fuselage. This arrangement may be used if balance considerations permit. In this location, the turret will not be limited in roll angle and could scan a full 360 degree arc around the horizontal roll axis.

The integration of the rotating tracker ball 51 into the body of the turret 41 of one embodiment is shown in FIGS. 9–17. The truncated sphere 51 containing the primary optical mirror is fitted into the clevis-like turret body 41 so that the airflow path is over a smooth hemisphere/cylinder combination body. The tracker ball 51 has a transparent window 53 perpendicular to the primary optical path 55 to or from the primary optical mirror 51 in the ball. The turret body 41 has an opening 61 formed through its front end 63 between its top and bottom sides 65 and 67 leaving two spaced apart sides 69 and 71. The ball is supported in the opening 61 for rotation from straight ahead (0°) where the plane of the window 53 is perpendicular to the axis 73 to a rearward position about 120° from the 0° position. On the top side of the rotating turret body, aft of the tracker ball, a portion is cut away at 75 to permit the passage of the optical beam in its most aft desired angle of rotation. Since the aft cutout rotates with the tracker body, its size is minimized to only that required for the passage of the actual optical beam. Reduction of the cutout results in improved flow around the total pod body assembly, and thus reduces the installed aerodynamic drag penalties.

Figure 16:
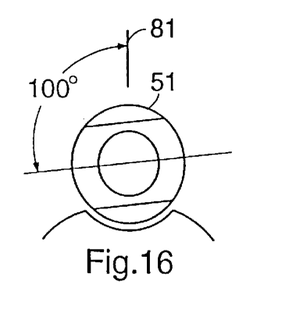
FIG. 16 is an end view similar to that of FIG. 15 with the turret rotated to the left.
Figure 17:
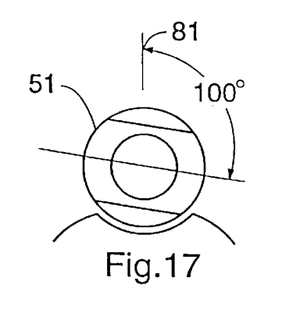
FIG. 17 is an end view similar to that of FIG. 15 with the turret rotated to the right.
Figure 18:
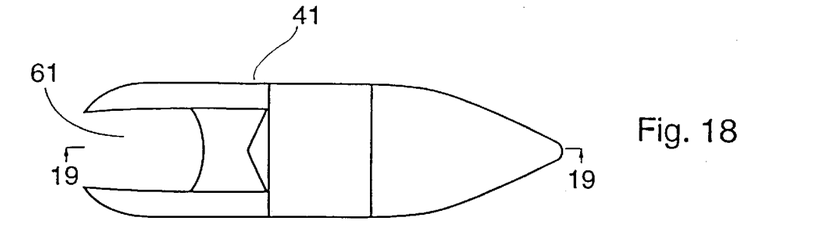
FIG. 18 is a top view of the fairing and turret of the preferred embodiment of the invention.
Figure 19:
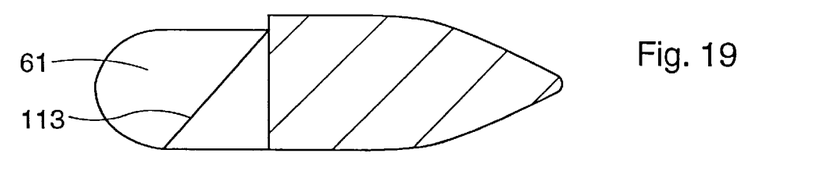
FIG. 19 is a cross-sectional view of the fairing and turret of FIG. 18 as seen along the lines 19—19 thereof.

The turret 41 rotates about the axis 73 relative to the fairing 43 which is fixed to the aircraft as shown in FIGS. 7 and 8. In the position shown in FIG. 7, the turret 41 and hence the ball 51 can rotate about the axis 73, about 100° on either side of the vertical line 81 as shown in FIGS. 16 and 17. When installed in the aircraft nose as shown in FIG. 8, the turret 41 and hence the ball 51 can rotate 360° about the axis 73. Except for the position of the window 53 on the optical tube and the shape of the rear wall of the opening 61, the basic optical components and mechanical mechanisms of the ball 51 and the turret 41 are the same as those of FIGS. 18–32.

Referring now to 18–32, the details of the optical and mechanical components of the invention will be described as well as the preferred embodiment of the tracker ball and turret.

The tracker ball 51 has a slanted, flat window 101 positioned over the optical aperture. A tubular member 103, circular in cross-section is located in the ball 51 and has an end portion 103E that extends beyond the ball and supports the light transparent window 101. The plane of the window 101 is supported at an angle of about 50° to the optical path 55 and about 40° relative to a plane 107 perpendicular to the optical axis 55 from the primary mirror 57. The 50° angle is an approximate maximum, and in practice could be less than 50°, as required by the specific application. The mirror 57 is supported at the opposite end of the tubular member 103.

Figure 29:
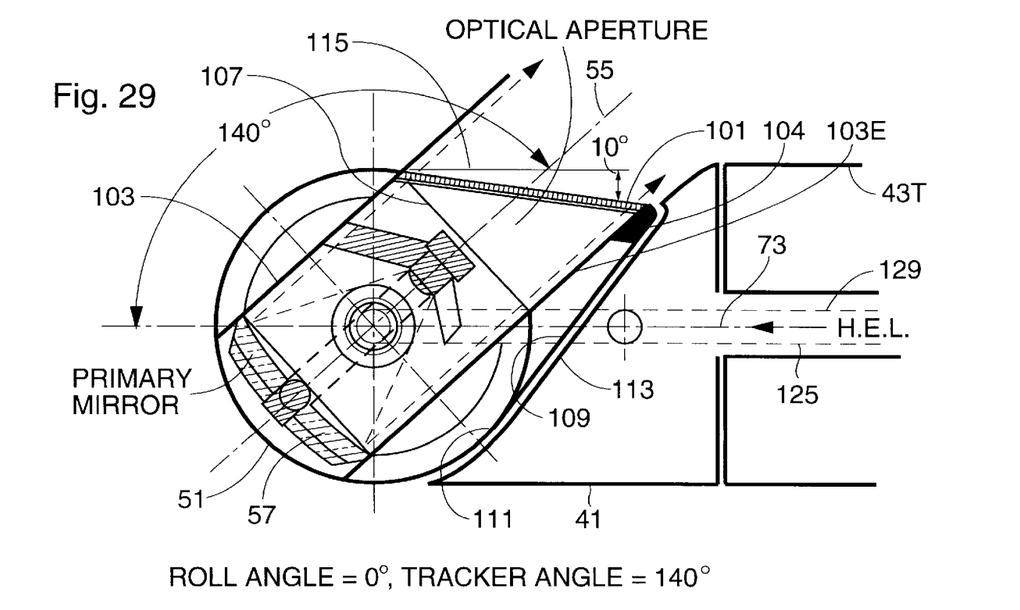
FIG. 29 is a side view illustration of the tracker, turret and fairing of the invention with the tracker positioned to look rearward.

As shown in FIG. 29, a straight wall portion 109 extends from a tangent position 111 from the ball 51 to the edge 104 of the tubular member 103. The front wall 113 of the turret 41 within the opening 61 is shaped to conform to the shape of the wall 109 and a portion of the ball 51 to allow the ball 51 to rotate from a forward (0°) position where the optical axis 55 is aligned with the fairing and the turret axis 73 about 140° to a rearward position where the plane of the window 101 is located about 10° below a line 115 which is level with the top edge 43T of the fairing 43. It is noted that the line 115 also is parallel to the axis 73 and intercepts the short end of the tubular member 103. The window angle of 50° is an example and may be greater or less than 50°. The tilted window 101 will not de-focus the light or high energy laser beam and will impede it no more than another window closing the opening. The tracker angle of 140° is an example and may be more of less than 140°. As described previously, the turret 43 with the ball 101 can rotate about the axis 73 relative to the fairing 43 which is fixed to the aircraft.

Figure 5:
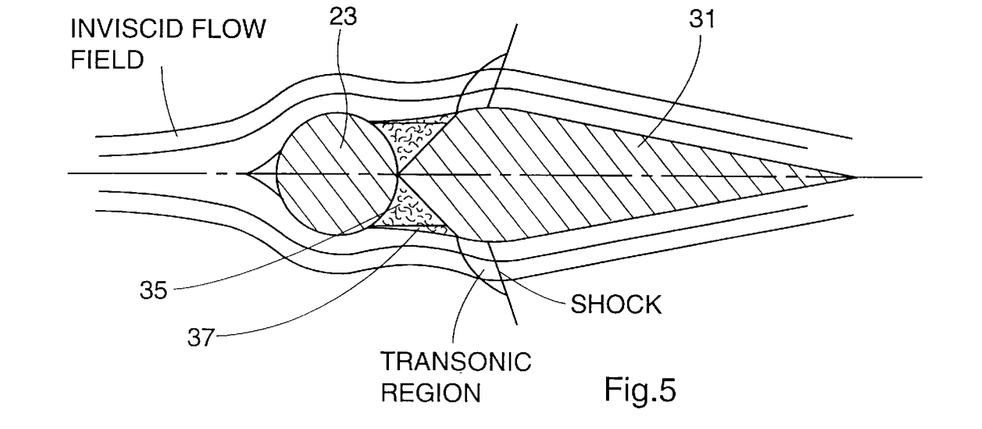
FIG. 5 shows the flow field around a turret with a separate aft fairing.

The purpose of slanting, or tilting, the window 101 is to provide a greatly reduced angle between the window and the local airstream when the turret ball is rotated to its maximum aft position. The window may be fixed at one angle, or with suitable structure and actuation, it may be articulated so as to rotate from the maximum angle with respect to the optical path to a lesser angle for the particular application. As shown in FIG. 5, air flowing naturally around a cylindrical or spherical body will not remain attached to the aft face of the body. When the flow separates, or detaches, it becomes more turbulent as shown at 35 and a shear layer 37 is formed, both of which tend to seriously aberrate an optical path passing through it. The point of detachment can be altered to varying degrees by means of active boundary layer controls or by passive protuberances or fins which modify the flow characteristics. These techniques are only moderately effective and frequently add significantly to the complexity, drag and cost of the system. Even with application of advanced flow control methods, the maximum angle that can be expected for undegraded flow still limits the tracker to about 100 to 120 degrees useful rotation from straight ahead. However, with the tilted window positioned at a fifty degree angle to the optical path, smooth airflow over the window can be expected with the tracker ball 13 rotated aft to 140 degrees. At the angle of rotation the window is only 10 degrees from being parallel to the local, undisturbed airstream and the flow will remain attached. This turning angle is not excessive and can easily be accomplished by the external airflow such that the local velocity vector is parallel to the window, thus avoiding local separation and its attendant high turbulence levels. Acceptable flow may be maintained over the window with lower tilt angles, as those skilled in the aerodynamic arts refine a particular application. However, as a general rule, when in the fully rotated position, the window should be at an angle no greater than approximately twenty degrees to the undisturbed, free-stream velocity vector.

Figures 20, 23, 24:
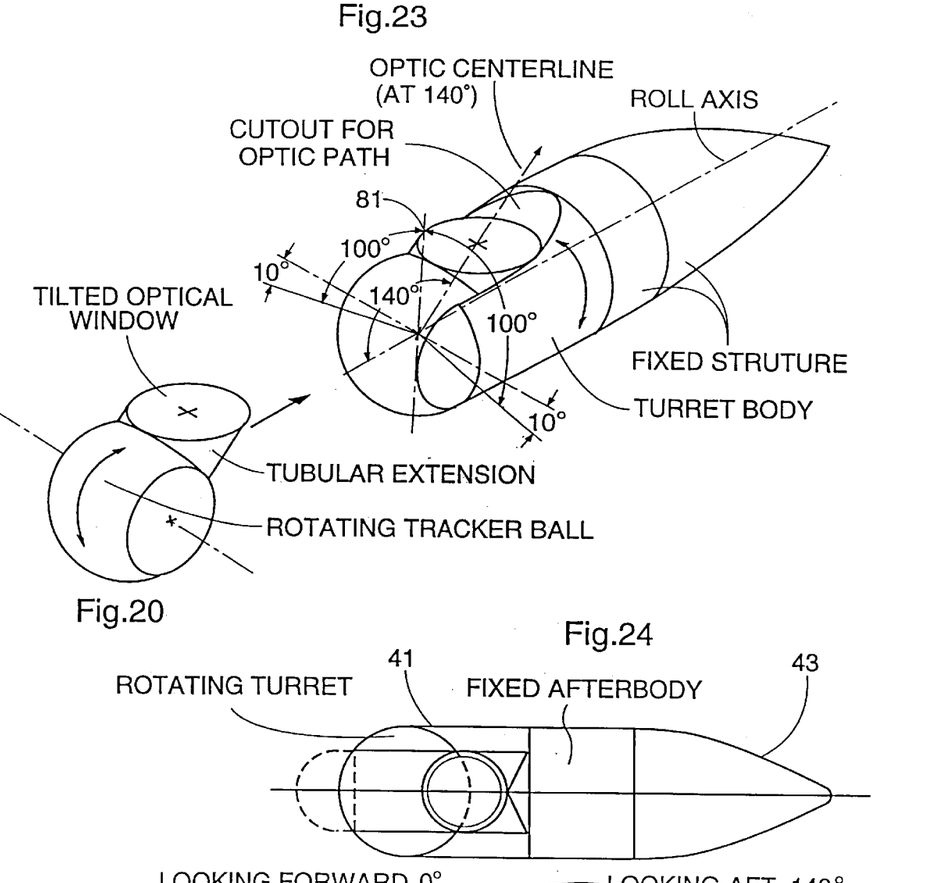
FIG. 20 is an isometric view of the optical tracker of the preferred embodiment of the invention.
FIG. 23 is an isometric view of the fairing and turret of FIGS. 18–22 with the tracker of FIGS. 20–22 located therein and positioned to look rearward.
FIG. 24 is a top view of FIG. 23.
Figure 21:
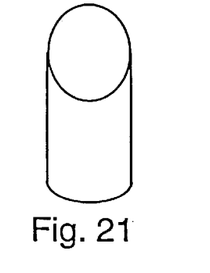
FIG. 21 is a top view of FIG. 20.
Figure 22:
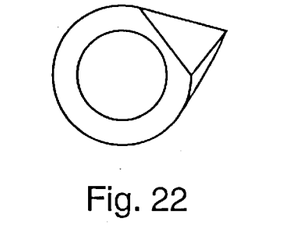
FIG. 22 is a side view of FIG. 20.
Figures 25, 26:
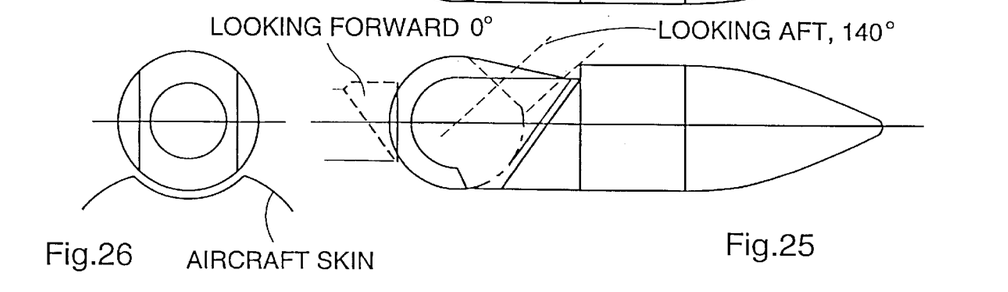
FIG. 25 is a side view of FIG. 23, with the tracker positioned to look rearward and also shown to look forward.
FIG. 26 is an end view of FIG. 25 with the tracker looking forward.

Note that in the FIGS. 16, 17, and 23 illustrations, the forward portion of the turret 41 can rotate 100 degrees downward on either side of the vertical 81. Within that rotating plane, the tracker ball 41 rotates in a fore and aft manner. The combination of the rotation about two axes permits full and continuous spherical coverage from ahead to 140 degrees aft and to 100 degrees downward on each side of the vertical line 81. These approximate angles are typical of the potential range for a partially submerged, upper-fuselage location, but should not be considered to be the maximum values achievable through skillful application of the invention.

The fairing 43 may be fixed to the aircraft as shown in FIGS. 7 and 8. In the fixed position as shown in FIG. 7, the turret 41 and hence the ball 51 can rotate about the axis 73, about 100 degrees on either side of the vertical line 81 as shown in FIGS. 16 and 17. In the fixed position as shown in FIG. 8, the turret 41 and hence the ball 51 can rotate 360 degrees about the axis 73.

Figure 27:
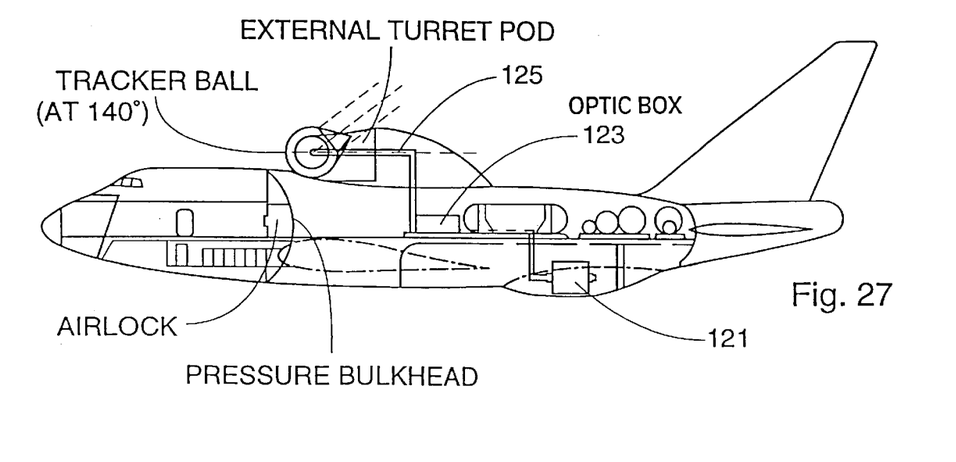
FIG. 27 shows a typical optical path in an aircraft for a laser application.
Figure 28:
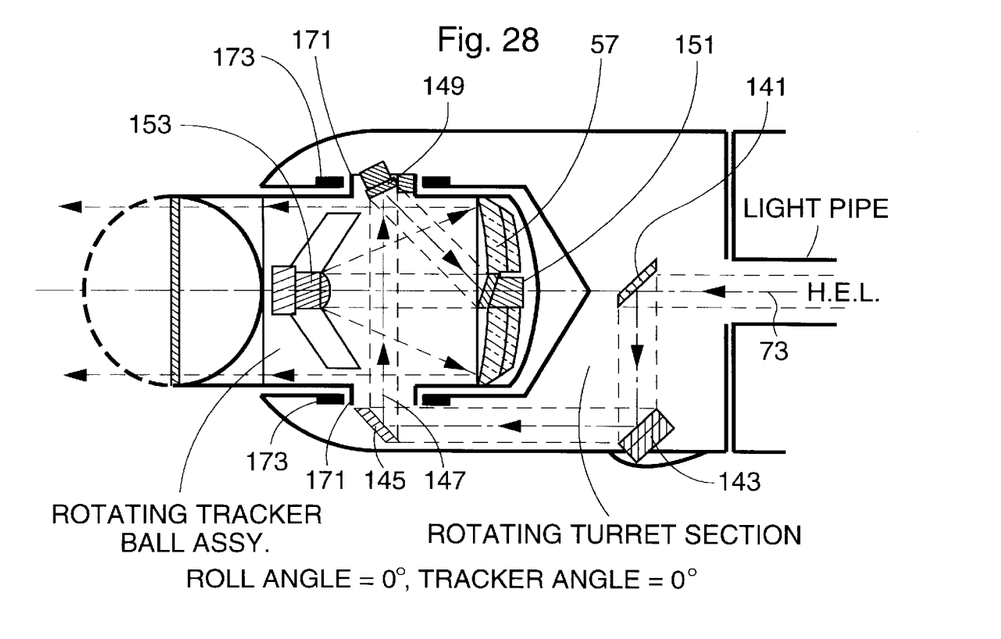
FIG. 28 is a top view illustration of the components of the tracker, turret and fairing of the invention with the tracker positioned to look forward.

In the preferred embodiment, the turret and tracker ball are employed to direct a high energy laser beam (H.E.L.) outward from a source 121 and components 123 carried by the aircraft, as shown in FIG. 27, although they could be used to view remote objects. In the preferred embodiment, passage of the laser beam to the turret and tracker ball are by way of a light pipe 125.

Referring to FIGS. 27–32, light or the high energy laser beam is directed to the tracker ball by way of a mirror 127 to a light pipe 129 which extends through the shaft 131 of the turret 43. The shaft 131 is connected to the turret and is supported for rotation about the roll axis 73 by bearings 133. The light pipe 129 extends into the turret along the axis 73 to a turning mirror 141 located in the turret which reflects the beam to a mirror 143. The mirror 143 reflects the beam to a mirror 145 located at the pitch axis 147 at one end of the tracker 51 pitch axis 147. The mirror 145 reflects the beam along the pitch axis 147 to a mirror 149 located at the other end of the tracker pitch axis 147. The mirror in turn reflects the beam to a mirror 151 located at the axis of the primary optical mirror 57 which in turn reflects the beam along the primary axis 55 to a mirror 153 located along the axis 55 forward of the mirror 57. The mirror 153 expands the beam to the full circumference of the mirror 57 which in turn directs the expanded beam outward along the axis 55 within the tube 103 and through the window 101 to the object of interest. The same system can be used to view a remote object with recording instrumentation being substituted for the laser equipment 123 and 121.

Figure 30:
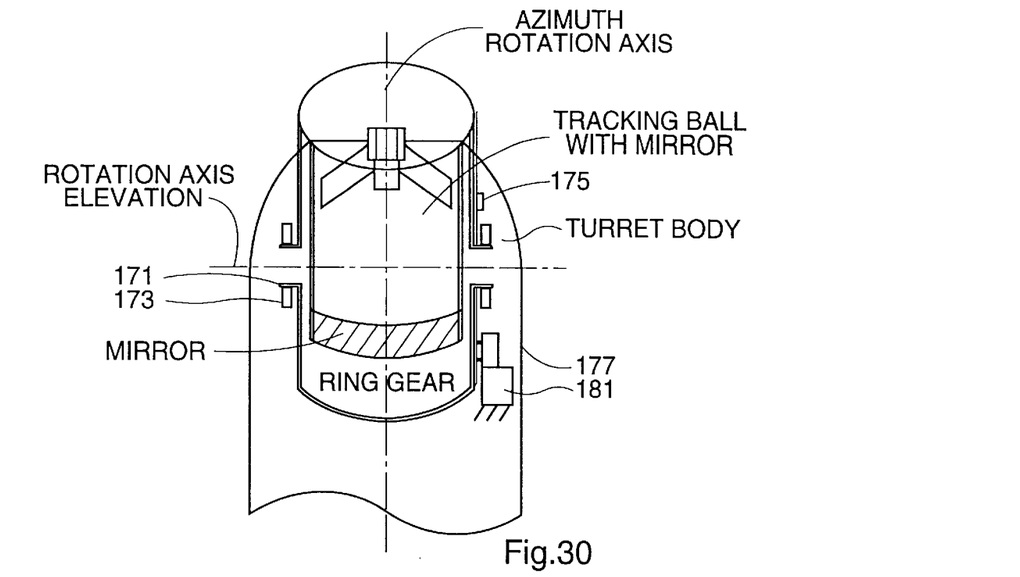
FIG. 30 is a top view of the tracker and turret of the invention showing the mechanism for rotating the tracker about the pitch axis.
Figure 31:
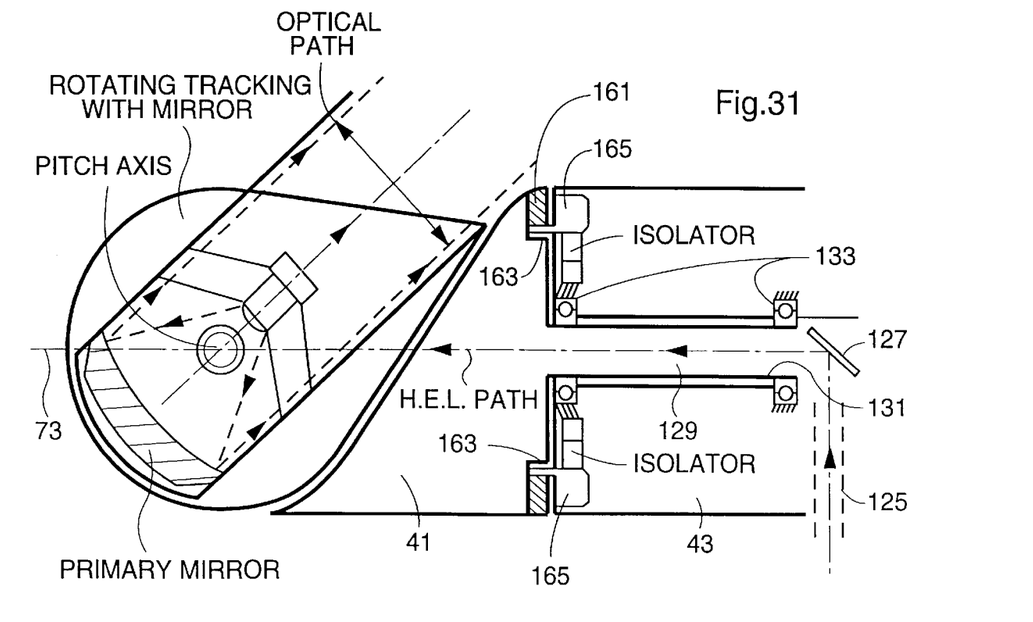
FIG. 31 is a side view of the tracker and turret of the invention showing the mechanism for rotating the turret about the roll axis.
Figure 32:
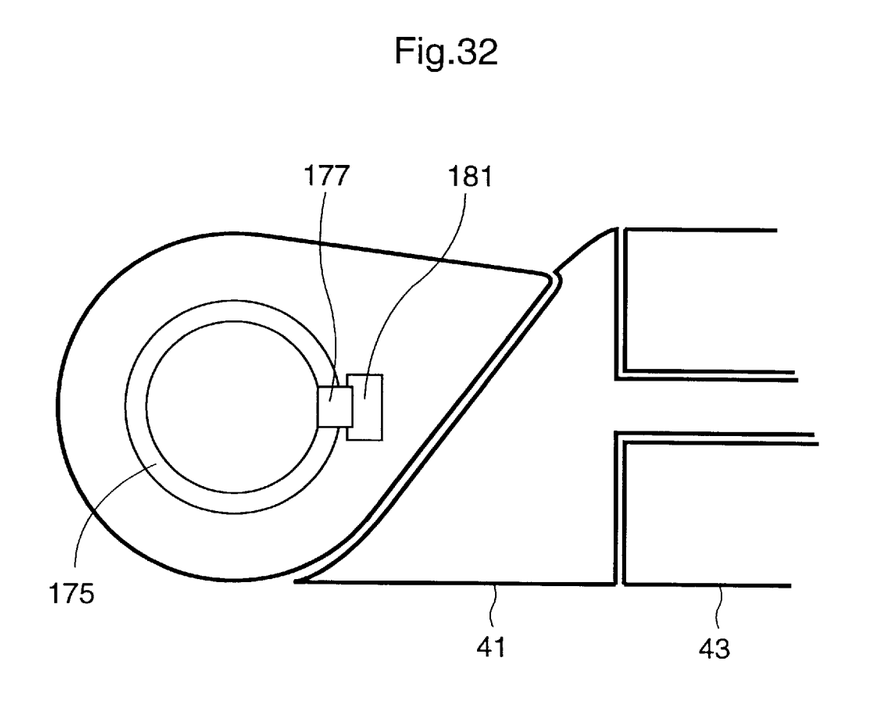
FIG. 32 is a side view of the tracker showing the ring gear mounted thereon and gear system and motor for rotating the tracker about the pitch axis.

The system for rotating the turret 41 about the roll axis 73 comprises an annular drive gear 161 mounted to the rear end of the turret 41 and dual gears 163 driven simultaneously by reversible synchronous dual electric motors 165 mounted to the fairing 43. The system for supporting the rotating tracker ball 51 for rotation about the pitch axis comprises hollow axial shaft 171 coupled to opposite sides of the ball and supported for rotation by bearings 173 mounted to the turret 41. The system for rotating the tracker ball 51 about the pitch axis comprises an annular ring gear 175 mounted to one side of the ball 51 and a gear 177 driven by a reversible electric motor 181 mounted to the turret 41.

We claim:

1. An optical apparatus for an aircraft, comprising:
  an aircraft having an elongated body,
  a fairing member having a front end and a rear end and an outward facing side with an axis extending between said front and rear ends,
  said fairing member being attached to said aircraft such that said front end and said outward facing side are external of said aircraft and said front end extends in a forward direction relative to said aircraft,
  a turret having a front end and a rear end with said rear end of said turret being coupled to said front end of said fairing member,
  an opening formed through said front end of said turret between the first and second sides,
  a tracking member supported in said opening of said turret for rotation about a pitch axis transverse to said axis of said fairing member,
  said tracking member having a cavity with a primary mirror at one end and a planar transparent shield at an opposite end with a primary optical axis extending between said mirror and said transparent shield,
  said tracking member being rotatable between a forward position and a rearward position about said pitch axis such that in said forward and rearward positions, said primary optical axis from said primary mirror extends forward and rearward respectively, and
  means for rotating said tracking member about said pitch axis between said forward and rearward positions,
  said shield forms an acute angle relative to said primary optical axis.

2. The apparatus of claim 1, comprising:
  secondary mirrors for directing an optical path between said axis of said fairing member and said primary mirror by way of said pitch axis when said tracking member and hence said primary optical axis is located at any position between said forward and rearward positions.

3. The apparatus of claim 1, comprising:
  a light pipe located along said axis of said fairing member and having a front end facing in the forward direction,
  first, second, third, fourth, fifth, and sixth secondary mirrors for directing a light path between said axis of said fairing member and said primary mirror by way of said pitch axis when said tracking member and hence said primary optical axis is located at any position between said forward and rearward positions,
  said first secondary mirror being located near said front end of said light pipe, said second secondary mirror being located transversely of said axis of said fairing member and said first secondary mirror, said third and fourth secondary mirrors being located transversely of said axis of said fairing member at opposite ends of said pitch axis, said fifth secondary mirror being located along said primary optical axis and at the axis of said primary optical mirror, and said sixth secondary mirror being located along said primary optical axis forward of said primary optical mirror such that the path of light between said front end of said light pipe and said primary optical mirror is defined by said first, second, third, fourth, fifth and sixth secondary mirrors, said path between said front end of said light pipe and said sixth secondary mirror being relatively small in cross-section defining a small cross-section path with the diameter of said primary optical mirror being greater than that of said small cross section path such that the path between said sixth secondary mirror and said primary optical mirror is cone-shaped.

4. The apparatus of claim 1, wherein:
  said axis of said fairing member comprises a roll axis,
  said turret is rotatable about said roll axis,
  means for rotating said turret about said roll axis.

5. The apparatus of claim 4, comprising:
  secondary mirrors for directing an optical path between said axis of said fairing member and said mirror by way of said pitch axis when said tracking member and hence said primary optical axis is located at any position between said forward and rearward positions.

6. The apparatus of claim 4, comprising:
  a light pipe located along said axis of said fairing member and having a front end facing in the forward direction,
  first, second, third, fourth, fifth and sixth secondary mirrors for directing a light path between said axis of said fairing member and said primary mirror by way of said pitch axis when said tracking member and hence said primary optical axis is located at any position between said forward and rearward positions,
  said first secondary mirror being located near said front end of said light pipe, said second secondary mirror being located transversely of said axis of said fairing member and said first secondary mirror, said third and fourth secondary mirrors being located transversely of said axis of said fairing member at opposite ends of said pitch axis, said fifth secondary mirror being located along said primary optical axis and at the axis of said primary optical mirror, and said sixth secondary mirror being located along said primary optical axis forward of said primary optical mirror such that the path of light between said front end of said light pipe and said primary optical mirror is defined by said first, second, third, fourth, fifth and sixth secondary mirrors, said path between said front end of said light pipe and said sixth secondary mirror being relatively small in cross-section defining a small cross-section path with the diameter of said primary optical mirror being greater than that of said small cross-section path such that the path between said sixth secondary mirror and said primary optical mirror is cone-shaped.

7. The apparatus of claim 1, wherein:

in a plane aligned with said primary optical axis and transverse to said pitch axis, the plane of said shield has first and second spaced apart edge portions on opposite sides of said primary optical axis with said first edge portion being closer to said pitch axis than said second edge portion, upon rotation of said tracking member between said forward and rearward positions, said primary optical axis passes through a position wherein said primary optical axis is perpendicular to said axis of said fairing member, in said plane aligned with said primary optical axis and transverse to said pitch axis, said first edge portion of said shield is located at a position which is forward of said second edge portion of said shield when said primary optical axis is perpendicular to said axis of said fairing member.

8. The apparatus of claim 7, wherein:

said acute angle is of the order of 50 degrees.

9. The apparatus of claim 7, wherein:

said primary optical axis is rotatable with said tracking member about 140 degrees between said forward and rearward positions.

10. The apparatus of claim 8, wherein:

said primary optical axis is rotatable with said tracking member about 140 degrees between said forward and rearward positions.

11. The apparatus of claim 7, wherein:

when said tracking member is located at said rearward position, said shield is located between said axis of said fairing member and a line parallel to and spaced from said axis of said fairing member such that the plane of said shield forms a second acute angle relative to said line with said second edge portion being located closer to said axis of said fairing member than said first edge portion.

12. The apparatus of claim 11, wherein:

said second acute angle is not greater than about 20 degrees.

13. The apparatus of claim 11, wherein:

said acute angle of the plane of said shield relative to said primary optical axis is of the order of 50 degrees.

14. The apparatus of claim 11, wherein:

said primary optical axis is rotatable about 140 degrees between said forward and rearward positions.

15. The apparatus of claim 13, wherein:

said primary optical axis is rotatable about 140 degrees between said forward and rearward positions.

16. The apparatus of claim 7, wherein:

said tracking member comprises curved structure which extends to said first edge portion of said shield such that said shield forms a smooth continuation of said curved structure.

17. The apparatus of claim 16, wherein:

when said tracking member is located at said rearward position, said shield is located between said axis of said fairing member and a line parallel to and spaced from said axis of said fairing member such that the plane of said shield forms a second acute angle relative to said line with said second edge portion being located closer to said axis of said fairing member than said first edge portion.

18. The apparatus of claim 17, wherein:

said second acute angle is not greater than about 20 degrees.

19. An optical apparatus to be coupled to an aircraft, comprising:

a fairing member to be attached to an aircraft and having a front end and a rear end with an axis extending between said front and rear ends, said fairing member having an outward facing side such that when said fairing member is attached to an aircraft, said front end and said outward facing side are external of the aircraft, a turret having a front end and a rear end with said rear end being coupled to said front end of said fairing member, an opening formed through said front end of said turret between first and second sides, a tracking member supported in said opening of said turret for rotation about a pitch axis transverse to said axis of said fairing member, said tracking member having a cavity with a primary mirror at one end and a planar transparent shield at an opposite end with a primary optical axis extending between said primary mirror and said transparent shield, said tracking member being rotatable between a forward position and a rearward position about said pitch axis such that in said forward and rearward positions, said primary optical axis from said primary mirror extends forward and rearward respectively, and means for rotating said tracking member about said pitch axis between said forward and rearward positions, said transparent shield forms an acute angle relative to said primary optical axis.

20. The apparatus of claim 19, wherein:

said primary optical axis is rotatable about 140 degrees between said forward and rearward positions.

21. The apparatus of claim 19, wherein:

said turret has a third side next to said outer side of said fairing member and a fourth side opposite said third side and which has a length greater than that of said third side, from said rear end of said turret, said turret has a rear wall between said first and second sides which slants rearward from said fourth side to said third side, an edge portion of said transparent shield is located adjacent said rear wall of said turret near said third side between said first and second sides when said tracking member is located in said rearward position.

22. The apparatus of claim 19, comprising:

secondary mirrors for directing an optical path between said axis of said fairing member and said mirror by way of said pitch axis when said tracking member and hence said primary optical axis is located at any position between said forward and rearward positions.

23. The apparatus of claim 19, comprising:

a light pipe located along said axis of said fairing member and having a front end facing in the forward direction, first, second, third, fourth, fifth and sixth secondary mirrors for directing a light path between said axis of said fairing member and said primary mirror by way of said pitch axis when said tracking member and hence said primary optical axis is located at any position between said forward and rearward positions, said first secondary mirror being located near said front end of said light pipe, said secondary mirror being located transversely of said axis of said fairing member and said first secondary mirror, said third and fourth secondary mirrors being located transversely of said axis of said fairing member at opposite ends of said pitch axis, said fifth secondary mirror being located along said primary optical axis and at the axis of said primary optical mirror, and said sixth secondary mirror being located along said primary optical axis forward of said primary optical mirror such that the path of light between said front end of said light pipe and said primary optical mirror is defined by said first, second, third, fourth, fifth and sixth secondary mirrors, said path between said front end of said light path and said sixth secondary being relatively small in cross-section defining a small cross-section path with the diameter of said primary optical mirror being greater than that of said small cross-section path such that the path between said sixth secondary mirror and said primary optical mirror is cone-shaped.

24. The apparatus of claim 19, comprising:

an aircraft, said fairing member being attached to said aircraft such that said outward facing side of said fairing member and said turret and said tracking member are external and face outward of said aircraft.

25. The apparatus of claim 19, wherein:

in a plane aligned with said primary optical axis and transverse to said pitch axis, the plane of said shield has first and second spaced apart edge portions on opposite sides of said primary optical axis with said first edge portion being closer to said pitch axis than said second edge portion, upon rotation of said tracking member between said forward and rearward positions, said primary optical axis passes through a position wherein said primary optical axis is perpendicular to said axis of said fairing member, in said plane aligned with said primary optical axis and transverse to said pitch axis, said first edge portion of said shield is located at a position which is forward of said second edge portion of said shield when said primary optical axis is perpendicular to said axis of said fairing member.

26. The apparatus of claim 25, wherein:

said acute angle is of the order of 50 degrees.

27. The apparatus of claim 25, wherein:

said primary optical axis is rotatable with said tracking member about 140 degrees between said forward and rearward positions.

28. The apparatus of claim 26, wherein:

said primary optical axis is rotatable with said tracking member about 140 degrees between said forward and rearward positions.

29. The apparatus of claim 25, wherein:

when said tracking member is located at said rearward position, said shield is located between said axis of said fairing member and a line parallel to and spaced from said axis of said fairing member such that the plane of said shield forms a second acute angle relative to said line with said second edge portion being located closer to said axis of said fairing member than said first edge portion.

30. The apparatus of claim 29, wherein:

said second acute angle is not greater than about 20 degrees.

31. The apparatus of claim 29, wherein:

said acute angle of the plane of said shield relative to said primary optical axis is of the order of 50 degrees.

32. The apparatus of claim 29, wherein:

said primary optical axis is rotatable about 140 degrees between said forward and rearward positions.

33. The apparatus of claim 31, wherein:

said primary optical axis is rotatable about 140 degrees between said forward and rearward positions.

34. The apparatus of claim 25, wherein:

said tracking member comprises curved structure which extends to said first edge portion of said shield such that said shield forms a smooth continuation of said curved structure.

35. The apparatus of claim 34, wherein:

when said tracking member is located at said rearward position, said shield is located between said axis of said fairing member and a line parallel to and spaced from said axis of said fairing member such that the plane of said shield forms a second acute angle relative to said line with said second edge portion being located closer to said axis of said fairing member than said first edge portion.

36. The apparatus of claim 35, wherein:

said second acute angle is not greater than about 20 degrees.

37. An optical apparatus to be coupled to an aircraft, comprising:

a fairing member to be attached to an aircraft and having a front end and a rear end with a roll axis extending between said front and rear ends, said fairing member having an outward facing side such that when said fairing member is attached to an aircraft, said front end and said outward facing side are external of the aircraft, a rotatable turret having a front end and a rear end with said rear end being coupled to said front end of said fairing member for rotation about said roll axis, means for rotating said turret about said roll axis, an opening formed through said front end of said turret between first and second sides, a tracking member supported in said opening of said turret for rotation about a pitch axis transverse to said roll axis, said tracking member having a cavity with a primary mirror at one end and a planar transparent shield at an opposite end with a primary optical axis extending between said primary mirror and said transparent shield, said tracking member being rotatable between a forward position and a rearward position about said pitch axis such that in said forward and rearward positions, said primary optical axis from said primary mirror extends forward and rearward respectively, and means for rotating said tracking member about said pitch axis between said forward and rearward positions, said transparent shield forms an acute angle relative to said primary optical axis.

38. The apparatus of claim 37, wherein:

said primary optical axis is rotatable about 140 degrees between said forward and rearward positions.

39. The apparatus of claim 37, wherein:

said turret has a third side next to said outer side of said fairing member and a fourth side opposite said third side and which has a length greater than that of said third side, from said rear end of said turret, said turret has a rear wall between said first and second sides which slants rearward from said fourth side to said third side, an edge portion of said transparent shield is located adjacent said rear wall of said turret near said third side between said first and second sides when said tracking member is in said rearward position.

40. The apparatus of claim 37, comprising:

secondary mirrors for directing a light path between said primary mirror and said roll axis by way of said pitch axis when said tracking member and hence said primary optical axis is located at any position between said forward and rearward positions.

41. The apparatus of claim 37, comprising:

a light pipe located along said elongated axis and having a front end facing in the forward direction, first, second, third, fourth, fifth and sixth secondary mirrors for directing a light path between said roll axis and said primary mirror by way of said pitch axis when said tracking member and hence said primary optical axis is located at any position between said forward and rearward positions, said first secondary mirror being located near said front end of said light pipe, said second secondary mirror being located transversely of said roll axis and said first secondary mirror, said third and fourth secondary mirrors being located transversely of said roll axis at opposite ends of said pitch axis, said fifth secondary mirror being located along said primary optical axis and at the axis of said primary optical mirror, and said sixth secondary mirror being located along said primary optical axis forward of said primary optical mirror such that the path of light between said front end of said light path and said primary optical mirror is defined by said first, second, third, fourth, fifth, and sixth secondary mirrors, said path between said front end of said light pipe and said sixth secondary mirror being relatively small in cross-section, defining a small cross-section path with the diameter of said primary optical mirror being greater than that of said small cross-section path such that the path between said sixth secondary mirror and said primary optical mirror is cone-shaped.

42. The apparatus of claim 37, comprising:

an aircraft, said fairing member being attached to said aircraft such that said outward facing side of said fairing member and said turret and tracking member are external and face outward of said aircraft.

43. The apparatus of claim 40, wherein:

said turret has a third side next to said outer side of said fairing member and a fourth side opposite said third side and which has a length greater than that of said third side, from said rear end of said turret, said turret has a rear wall between said first and second sides which slants rearward from said fourth side to said third side, an edge portion of said transparent shield is located adjacent said rear wall of said turret near said third side between said first and second sides when said tracking member is in said rearward position.

44. The apparatus of claim 41, wherein:

said turret has a third side next to said outer side of said fairing member and a fourth side opposite said third side and which has a length greater than that of said third side, from said rear end of said turret, said turret has a rear wall between said first and second sides which slants rearward from said fourth side to said third side, an edge portion of said transparent shield is located adjacent said rear wall of said turret near said third side between said first and second sides when said tracking member is in said rearward position.

45. The apparatus of claim 37, wherein:

in a plane aligned with said primary optical axis and transverse to said pitch axis, the plane of said shield has first and second spaced apart edge portions on opposite sides of said primary optical axis with said first edge portion being closer to said pitch axis than said second edge portion, upon rotation of said tracking member between said forward and rearward positions, said primary optical axis passes through a position wherein said primary optical axis is perpendicular to said roll axis of said fairing member, in said plane aligned with primary optical axis and transverse to said pitch axis, said first edge portion of said shield is located at a position which is forward of said second edge portion of said shield when said primary optical axis is perpendicular to said roll axis of said fairing member.

46. The apparatus of claim 45, wherein:

when said tracking member is located at said rearward position, said shield is located between said roll axis of said fairing member and a line parallel to and spaced from said roll axis of said fairing member such that the plane of said shield forms a second acute angle relative to said line with said second edge portion being located closer to said roll axis of said fairing member than said first edge portion.

47. The apparatus of claim 46, wherein:

said second acute angle is not greater than about 20 degrees.

48. The apparatus of claim 47, wherein:

said tracking member comprises curved structure which extends to said first edge portion of said shield such that said shield forms a smooth continuation of said curved structure.

49. The apparatus of claim 45, wherein:

said acute angle of the plane of said shield relative to said primary optical axis is of the order of 50 degrees.

50. The apparatus of claim 45, wherein:

said primary optical axis is rotatable about 140 degrees between said forward and rearward positions.

51. The apparatus of claim 49, wherein:

said primary optical axis is rotatable about 140 degrees between said forward and rearward positions.

* * * * *